(12) United States Patent
Tsang

(10) Patent No.: US 7,403,376 B2
(45) Date of Patent: Jul. 22, 2008

(54) AUTOMATIC STABILIZING DEVICE FOR A DISPLAY

(75) Inventor: Ching-Ming Tsang, Gueishan Township, Taoyuan County (TW)

(73) Assignee: Hannspree Inc., Taipei (TW)

( * ) Notice: Subject to any disclaimer, the term of this patent is extended or adjusted under 35 U.S.C. 154(b) by 465 days.

(21) Appl. No.: 11/313,610

(22) Filed: Dec. 20, 2005

(65) Prior Publication Data

US 2007/0133157 A1    Jun. 14, 2007

(30) Foreign Application Priority Data

Dec. 12, 2005    (TW)    ............................. 94143822 A

(51) Int. Cl.
*H05K 5/00*    (2006.01)
*H05K 7/00*    (2006.01)
*F16M 13/00*    (2006.01)
*A47B 81/00*    (2006.01)
*A47B 97/00*    (2006.01)

(52) U.S. Cl. ....................... 361/681; 361/680; 248/917; 248/918; 248/919; 248/920; 248/921; 248/922; 248/923; 248/550; 312/223.1; 312/223.2

(58) Field of Classification Search ................. 361/680, 361/681; 248/550, 917–923, 123.11, 122.1, 248/124.1, 124.2, 125.2, 180.1, 346.01, 346.04, 248/346.05; 312/223.1, 223.2; 348/825–828; 349/58, 60

See application file for complete search history.

(56) References Cited

U.S. PATENT DOCUMENTS

| | | | | |
|---|---|---|---|---|
| 5,175,672 A | * | 12/1992 | Conner et al. | ................ 361/680 |
| 6,053,589 A | * | 4/2000 | Lin | .............................. 312/271 |
| 6,198,624 B1 | * | 3/2001 | Margaritis | ................... 361/681 |
| 6,353,529 B1 | * | 3/2002 | Cies | ............................ 361/681 |
| 6,665,175 B1 | * | 12/2003 | deBoer et al. | ............... 361/681 |
| 6,870,730 B2 | * | 3/2005 | Riddiford | .................... 361/681 |
| 6,873,521 B2 | * | 3/2005 | Landry et al. | ................ 361/681 |
| 7,114,694 B2 | * | 10/2006 | Li | .............................. 248/677 |
| 7,195,221 B2 | * | 3/2007 | Maeda et al. | ........... 248/346.01 |
| 7,274,556 B2 | * | 9/2007 | Chung | ......................... 361/681 |
| 7,298,610 B2 | * | 11/2007 | Kim et al. | .................... 361/683 |
| 2004/0113031 A1 | * | 6/2004 | Sung | .......................... 248/146 |

(Continued)

FOREIGN PATENT DOCUMENTS

TW    438211    5/2001

*Primary Examiner*—Jayprakash N Gandhi
*Assistant Examiner*—Anthony M Haughton
(74) *Attorney, Agent, or Firm*—Thomas, Kayden, Horstemeyer & Risley

(57) ABSTRACT

An automatic stabilizing device. A base plate includes a through hole. An imbalance detecting mechanism is disposed on the base plate and includes a detecting member and an engaging member connected thereto. The detecting member is movably disposed inside the through hole. A sliding support plate is disposed on the base plate and detachably connected to the imbalance detecting mechanism. The sliding support plate includes an engaging hole in which the engaging member is detachably engaged. A first resilient member is connected between the base plate and the sliding support plate, providing a first predetermined resilience to the sliding support plate. When the base plate swings to extend the detecting member from the through hole, the engaging member moves and disengages from the engaging hole, and the sliding support plate slides to protrude from the base plate by the first predetermined resilience.

24 Claims, 11 Drawing Sheets

U.S. PATENT DOCUMENTS

| | | |
|---|---|---|
| 2005/0236535 A1* | 10/2005 | Maeda et al. ............ 248/176.1 |
| 2006/0027723 A1* | 2/2006 | Wu ........................ 248/346.01 |
| 2007/0210220 A1* | 9/2007 | Sawai et al. ............. 248/122.1 |
| 2007/0215760 A1* | 9/2007 | Sawai et al. ............. 248/122.1 |
| 2007/0215761 A1* | 9/2007 | Sawai et al. ............. 248/122.1 |
| 2008/0023598 A1* | 1/2008 | Tsuo et al. ............... 248/122.1 |
| 2008/0023599 A1* | 1/2008 | Lin ......................... 248/122.1 |

\* cited by examiner

AUTOMATIC STABILIZING DEVICE FOR A DISPLAY

BACKGROUND OF THE INVENTION

1. Field of the Invention

The invention relates to an automatic stabilizing device, and in particular to an automatic stabilizing device for a display.

2. Description of the Related Art

A flat display is generally placed on a flat surface. When subjected to external force or agitation, the flat display can easily tip over due to a thin main body thereof. To overcome the aforementioned problem, some flat displays are equipped with stabilizing devices. For example, a conventional flat display can be fixed to a surface, such as a table, by fixing a strap to a pedestal of the flat display and the surface of a table, such that the conventional flat display does not tip over when subjected to external force. Nevertheless, the strap adversely affects the appearance of the flat display and causes inconvenience of packaging, transportation, assembly, or disassembly of the flat display.

Taiwan Pat. No. 438211 discloses conventional stabilizing devices for a notebook computer. The stabilizing devices support a host or an LCD of the notebook computer. Nevertheless, these devices require manual operation, causing inconvenience of operation.

Hence, there is a need for an automatic stabilizing device protecting a display from tipping over from external force.

BRIEF SUMMARY OF THE INVENTION

A detailed description is given in the following embodiments with reference to the accompanying drawings.

An exemplary embodiment of the invention provides an automatic stabilizing device comprising a base plate, an imbalance detecting mechanism, a sliding support plate, and a first resilient member. The base plate comprises a through hole. The imbalance detecting mechanism is disposed on the base plate and is designed to comprise a detecting member and an engaging member connected thereto. The detecting member is movably disposed inside the through hole. The sliding support plate is disposed on the base plate and detachably connected to the imbalance detecting mechanism. The sliding support plate comprises an engaging hole in which the engaging member is detachably engaged. The first resilient member is connected between the base plate and the sliding support plate, providing a first predetermined resilience to the sliding support plate. When the base plate swings to extend the detecting member from the through hole, the engaging member moves and disengages from the engaging hole, and the sliding support plate slides to protrude from the base plate by the first predetermined resilience.

The imbalance detecting mechanism further comprises a sleeve corresponding to the through hole of the base plate. The detecting and engaging members are movably disposed inside the sleeve. The engaging member moves into the sleeve when the detecting member moves to extend from the through hole.

The imbalance detecting mechanism further comprises a second resilient member abutting the sleeve and the detecting member, providing a second predetermined resilience to the detecting member.

The sleeve comprises a sliding groove. The detecting member comprises a positioning portion sliding in the sliding groove.

The imbalance detecting mechanism further comprises a knob. The sleeve further comprises a through groove. The detecting member further comprises a recessed groove corresponding to the through groove. The knob is rotatably and detachably engaged in the through and the recessed grooves.

The imbalance detecting mechanism further comprises a third resilient member disposed between the detecting member and the engaging member.

The imbalance detecting mechanism further comprises a sub-sleeve disposed on the detecting member. The engaging member abuts the sub-sleeve. The third resilient member is disposed inside the sub-sleeve.

The sliding support plate further comprises a roller opposite to the engaging hole.

The engaging member comprises a sloped guiding surface opposite to the roller.

The automatic stabilizing device further comprises a cover rotatably connected to the base plate and is opposite and adjacent to the roller. The cover is made of elastic material.

The automatic stabilizing device further comprises an intermediate plate disposed on the base plate. The sliding support plate is disposed on the intermediate plate. The first resilient member is disposed in the intermediate plate and connected between the intermediate plate and the sliding support plate.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the preferred embodiments of the invention. This description is made for the purpose of illustrating the general principles of the invention and should not be taken as limit of the scope of present invention.

Figure 1:
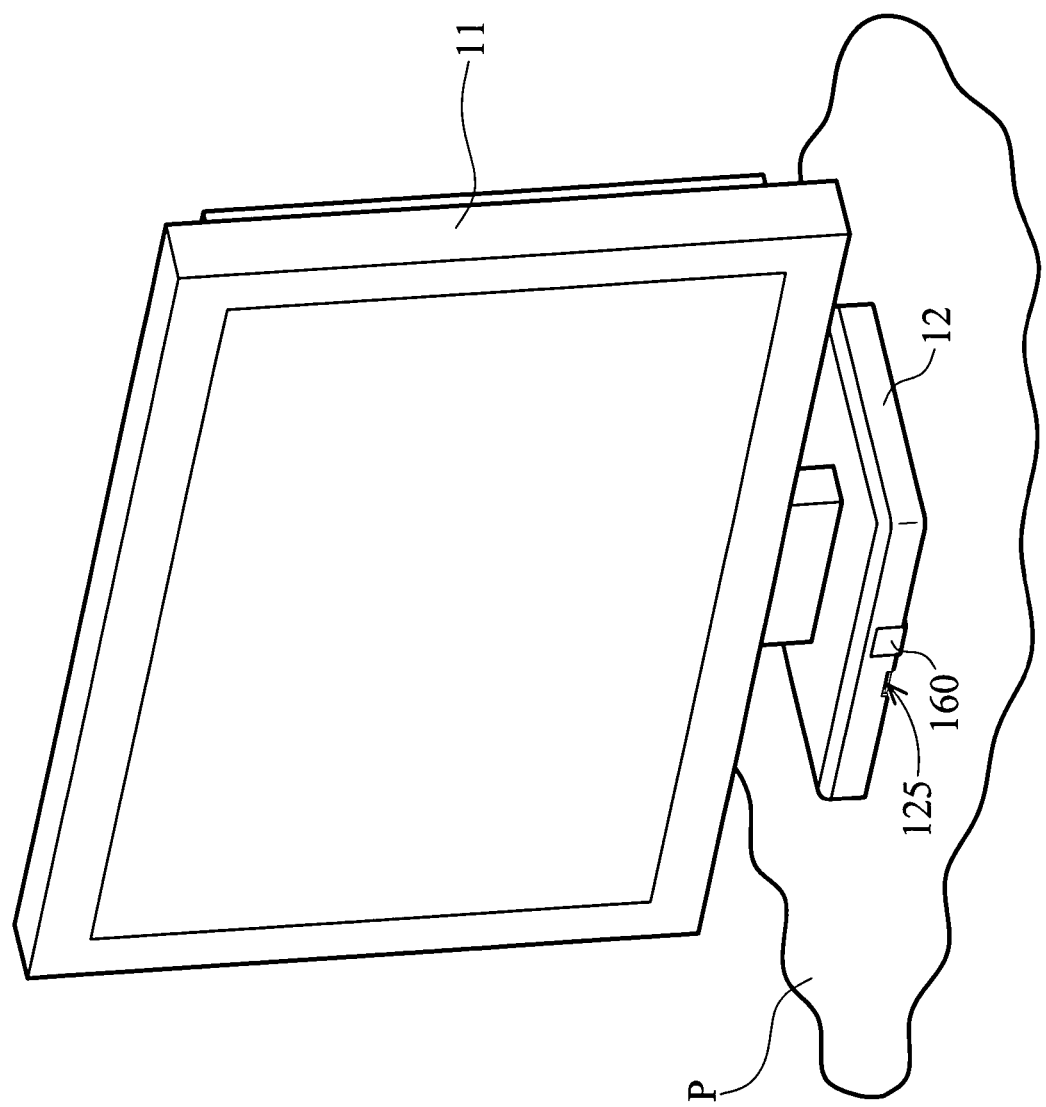
FIG. 1 is a schematic perspective view of a display of the invention.
Figure 2:
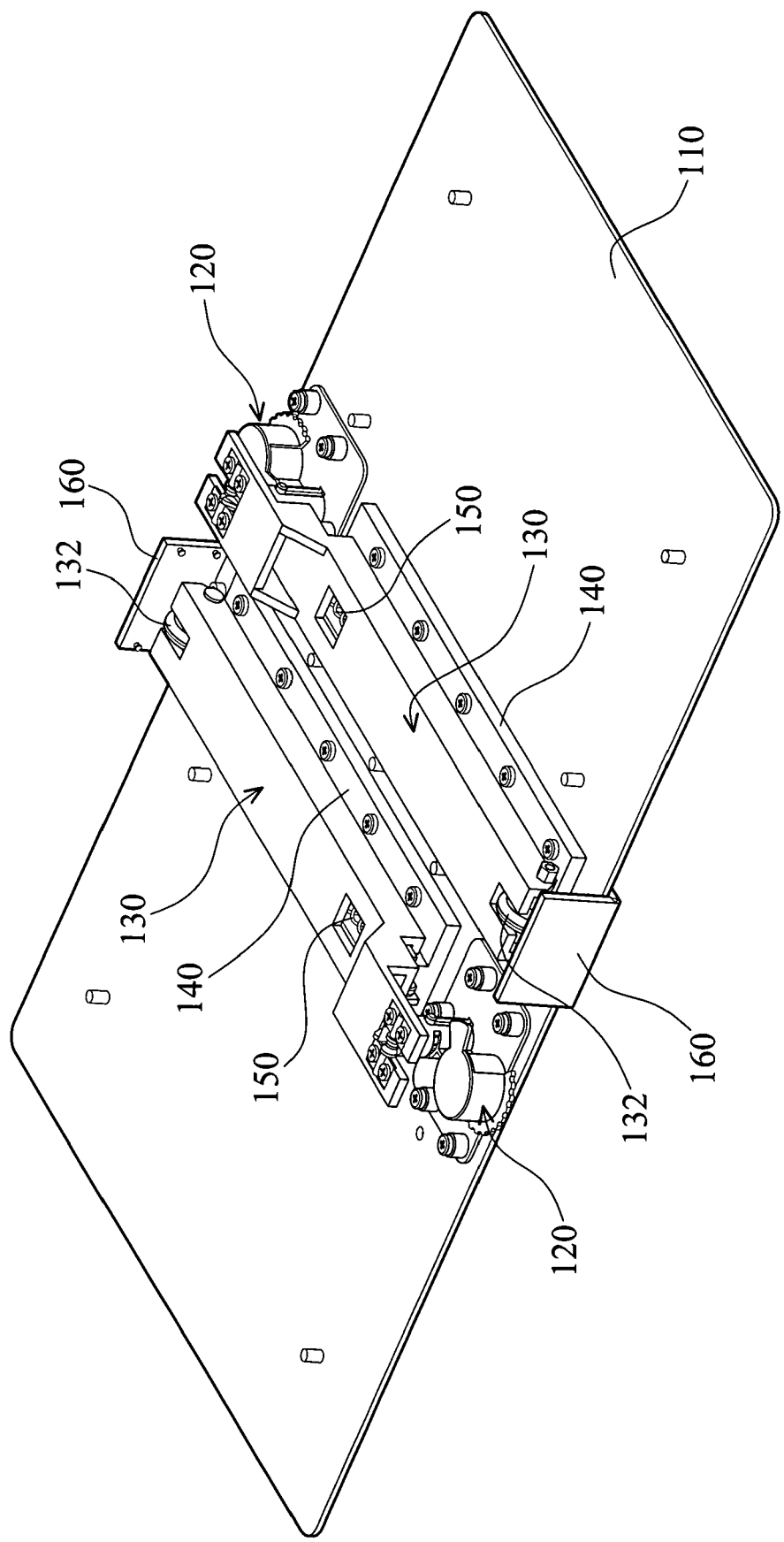
FIG. 2 is a schematic perspective view of an automatic stabilizing device of the invention.

Referring to FIG. 1 and FIG. 2, a display 10 comprises a monitor 11, a supporting pedestal 12, and an automatic stabilizing device 100. The supporting pedestal 12 is connected to and is acted for supporting the monitor 11. The automatic stabilizing device 100 is disposed in the supporting pedestal 12.

As shown in FIG. 2, the automatic stabilizing device 100 comprises a base plate 110, two imbalance detecting mechanisms 120, two sliding Support plates 130, two intermediate plates 140, two first resilient members 150, and two covers 160. In this embodiment, the imbalance detecting mechanisms 120, sliding support plates 130, intermediate plates 140, first resilient members 150, and covers 160 are respectively opposite to each other.

Figure 5:
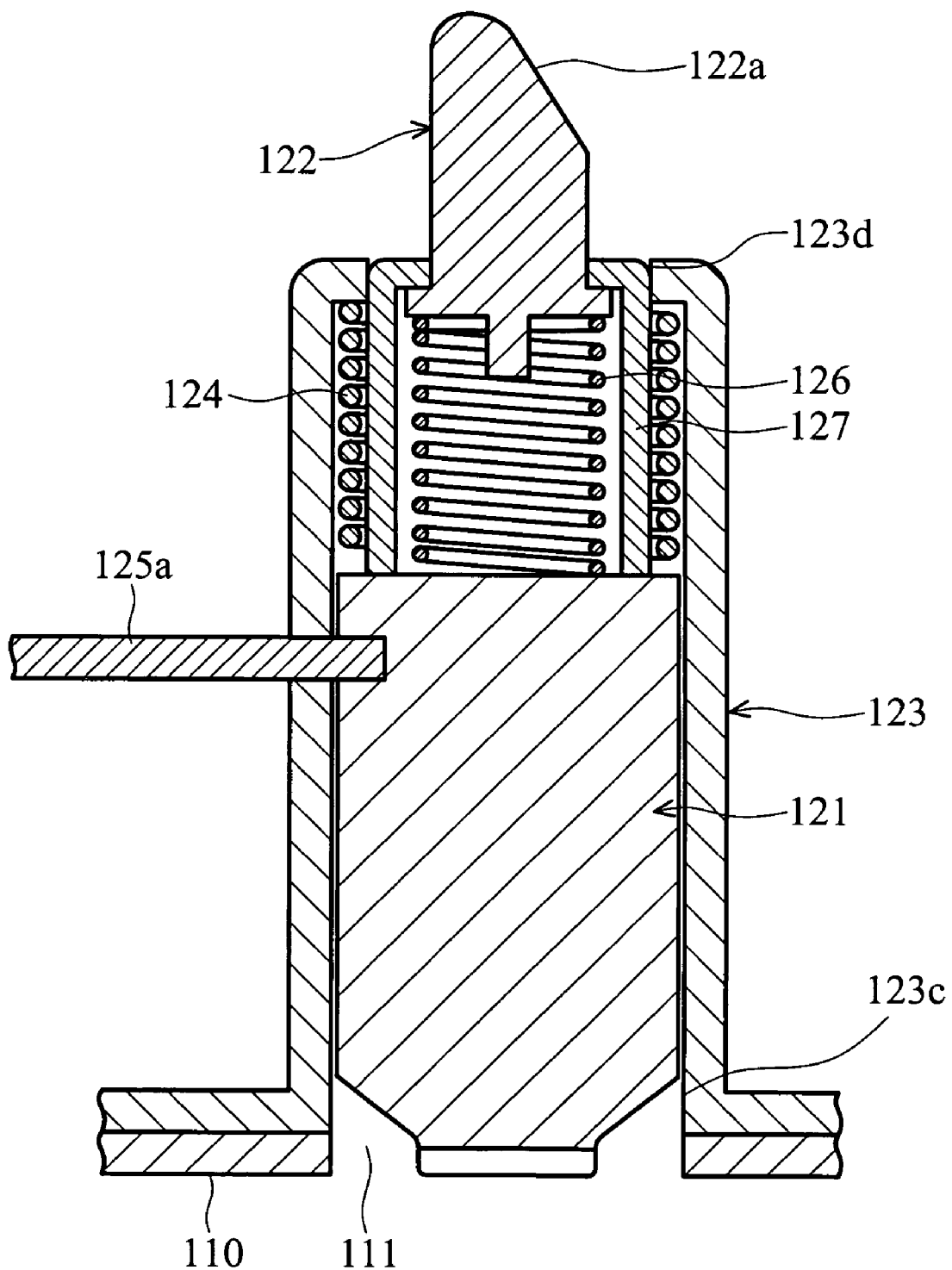
FIG. 5 is a schematic partial cross section of FIG. 3.
Figure 8:
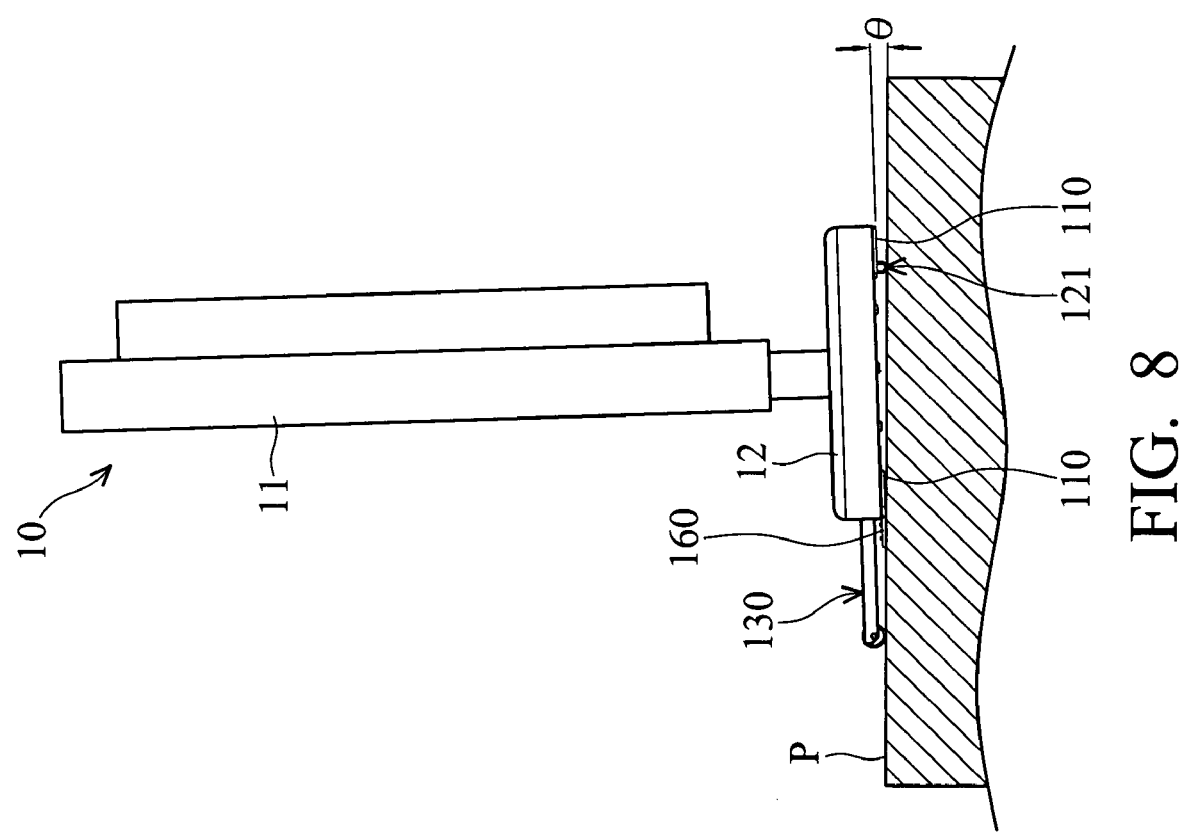
FIG. 8 is a schematic view showing operation of the display and automatic stabilizing device of the invention.
Figure 11:
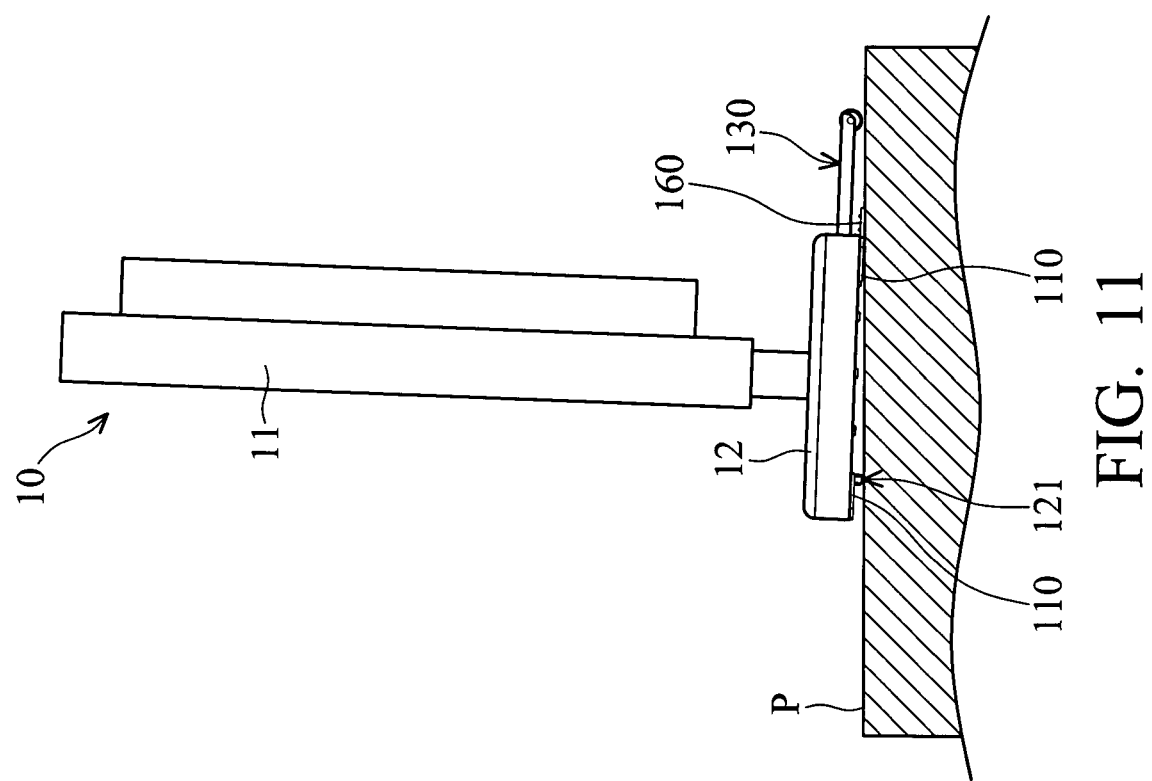
FIG. 11 is another schematic view showing operation of the display and automatic stabilizing device of the invention.

Referring to FIGS. 5, 8, and 11, the base plate 110 is disposed under and connected to the supporting pedestal 12. Moreover, the base plate 110 comprises two through holes 111 (only one through hole 111 is shown in FIG. 5).

Figure 3:
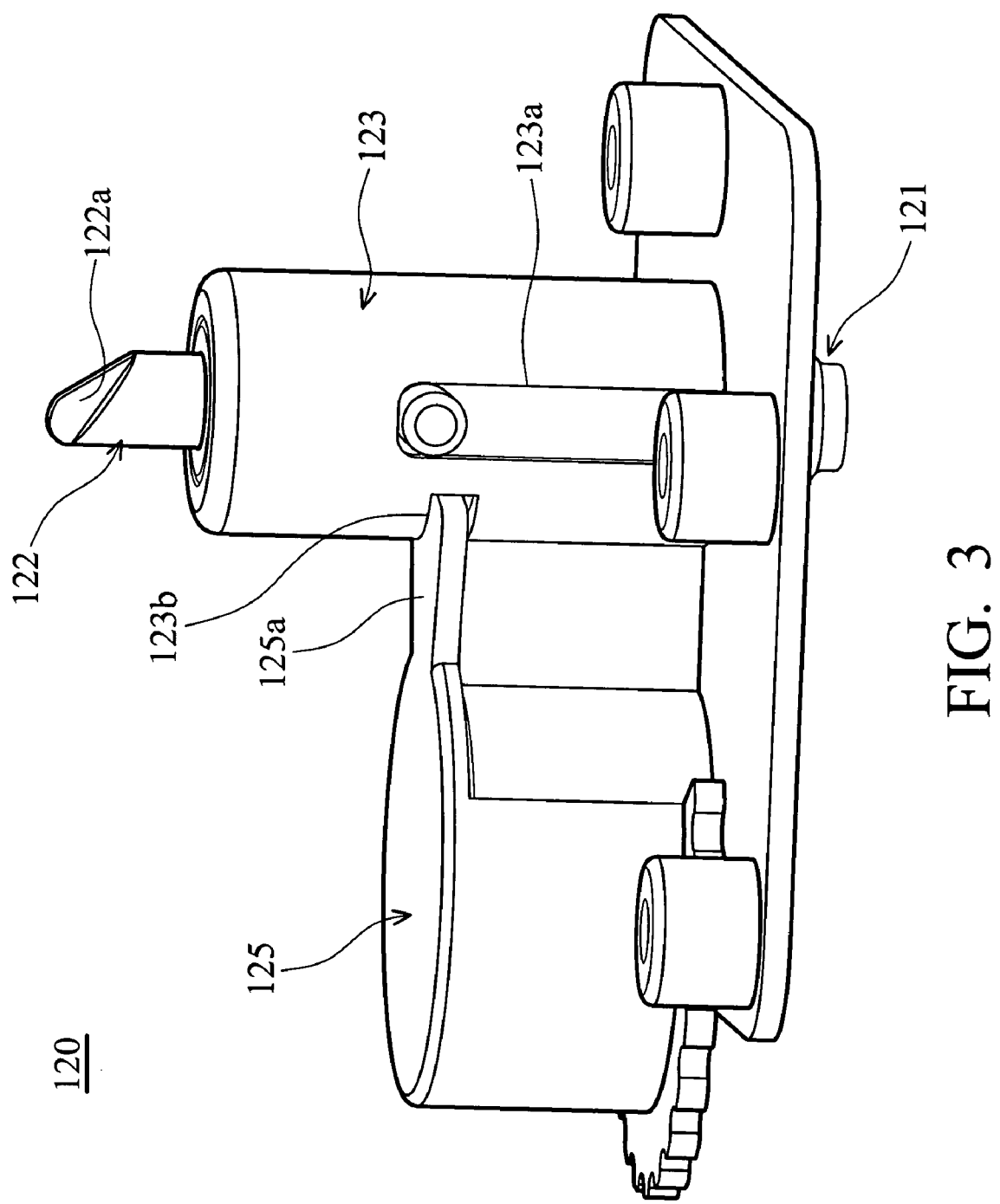
FIG. 3 is a perspective assembly view of an imbalance detecting mechanism of the automatic stabilizing device of the invention.
Figure 4:
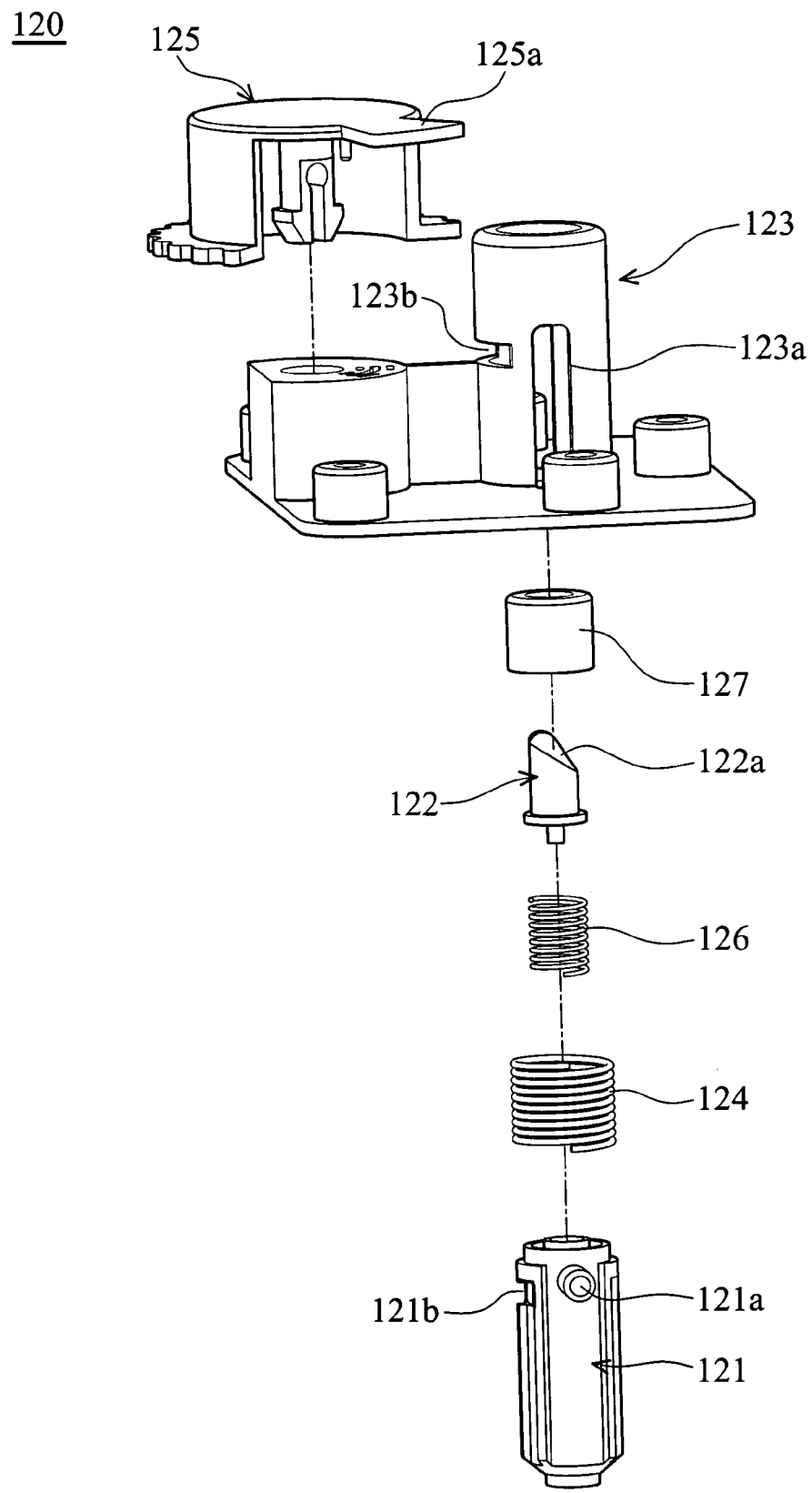
FIG. 4 is a perspective exploded view of the imbalance detecting mechanism of the automatic stabilizing device of the invention.

As shown in FIGS. 3, 4, and 5, each imbalance detecting mechanism 120 is disposed on the base plate 110 and comprises a detecting member 121, an engaging member 122, a sleeve 123, a second resilient member 124, a knob 125, a third resilient member 126, and a sub-sleeve 127.

The sleeve 123 corresponds to the through hole 111 of the base plate 110 and comprises a sliding groove 123a, a through groove 123b, a first opening 123c, and a second opening 123d. The first opening 123c is opposite to the second opening 123d and corresponds to the through hole 111. The detecting member 121 and engaging member 122 are movably disposed inside the sleeve 123. The detecting member 121 is movably disposed inside the through hole 111 of the base plate 110. Specifically, the detecting member 121 comprises a positioning portion 121a and a recessed groove 121b selectively corresponding to the through groove 123b. When the detecting member 121 moves in the sleeve 123, the positioning portion 121a slides in the sliding groove 123a, preventing the detecting member 121 from rotation and deflection. Moreover, the engaging member 122 comprises a sloped guiding surface 122a formed on the top thereof.

As shown in FIG. 5, the sub-sleeve 127 is disposed on the detecting member 121 and the engaging member 122 abuts the sub-sleeve 127. The third resilient member 126 is disposed inside the sub-sleeve 127 and between the detecting member 121 and the engaging member 122. Namely, the engaging member 122 is connected to the detecting member 121 by the sub-sleeve 127 and third resilient member 126. As shown in FIG. 5, being not stretched or compressed, the third resilient member 126 provides no resilience. Additionally, the third resilient member 126 may be a spring.

The second resilient member 124 abuts the sleeve 123 and the detecting member 121, providing a second predetermined resilience to the detecting member 121. Additionally, the second resilient member 124 may be a spring.

The knob 125 is rotatably and detachably engaged in the through groove 123b of the sleeve 123 and the recessed groove 121b of the detecting member 121. Specifically, as shown in FIGS. 1, 3, 4, and 5, the knob 125 protrudes from the supporting pedestal 12 and comprises a protruding rib 125a. The protruding rib 125a can be selectively engaged in the through groove 123b and the recessed groove 121b.

When the imbalance detecting mechanism 120 is assembled, the detecting member 121 is disposed inside the sleeve 123 and through hole 111 of the base plate 110, and the engaging member 122 protrudes from the second opening 123d of the sleeve 123.

As shown in FIG. 2, each intermediate plate 140 is disposed on the base plate 110 and each first resilient member 150 in each intermediate plate 140.

Figure 6:
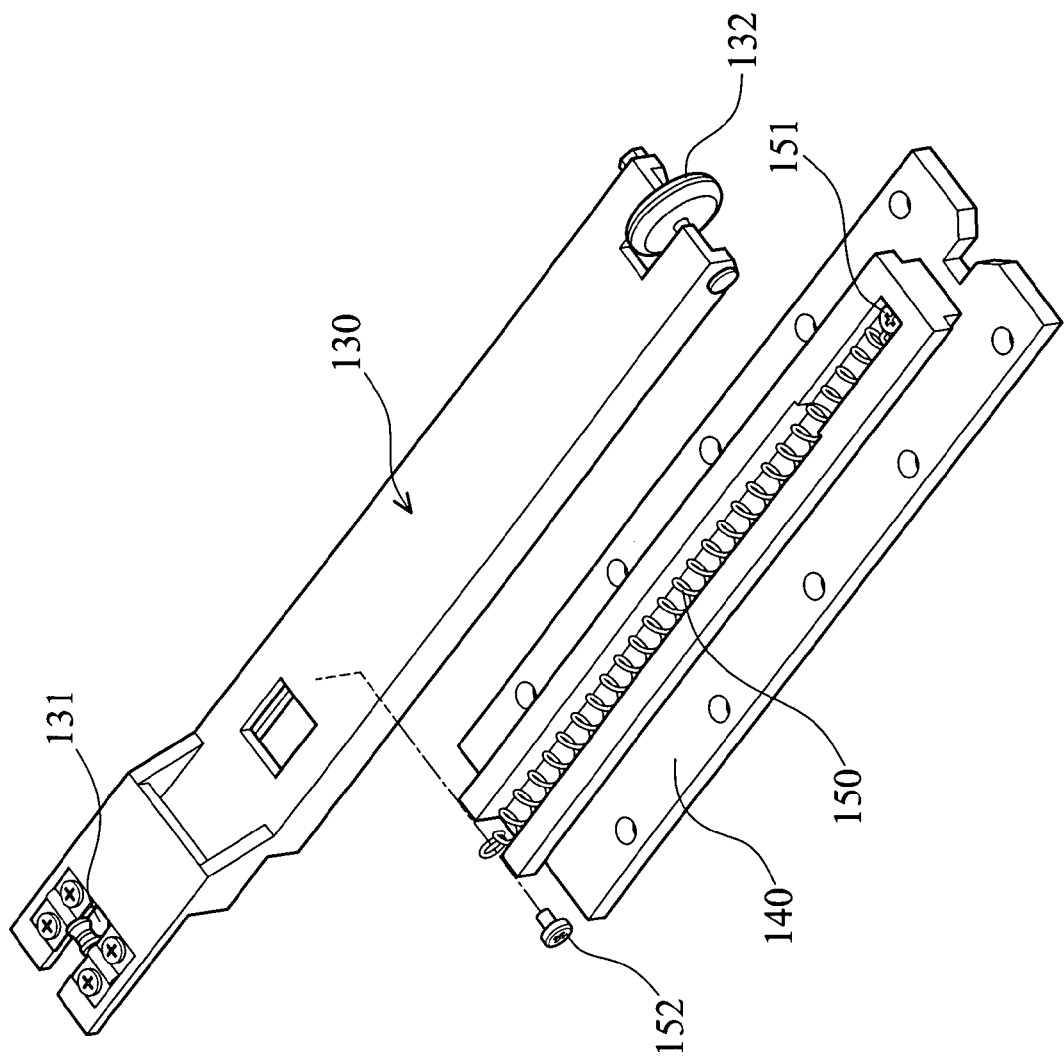
FIG. 6 is a perspective exploded view of a sliding support plate and an intermediate plate of the automatic stabilizing device of the invention.
Figure 7:
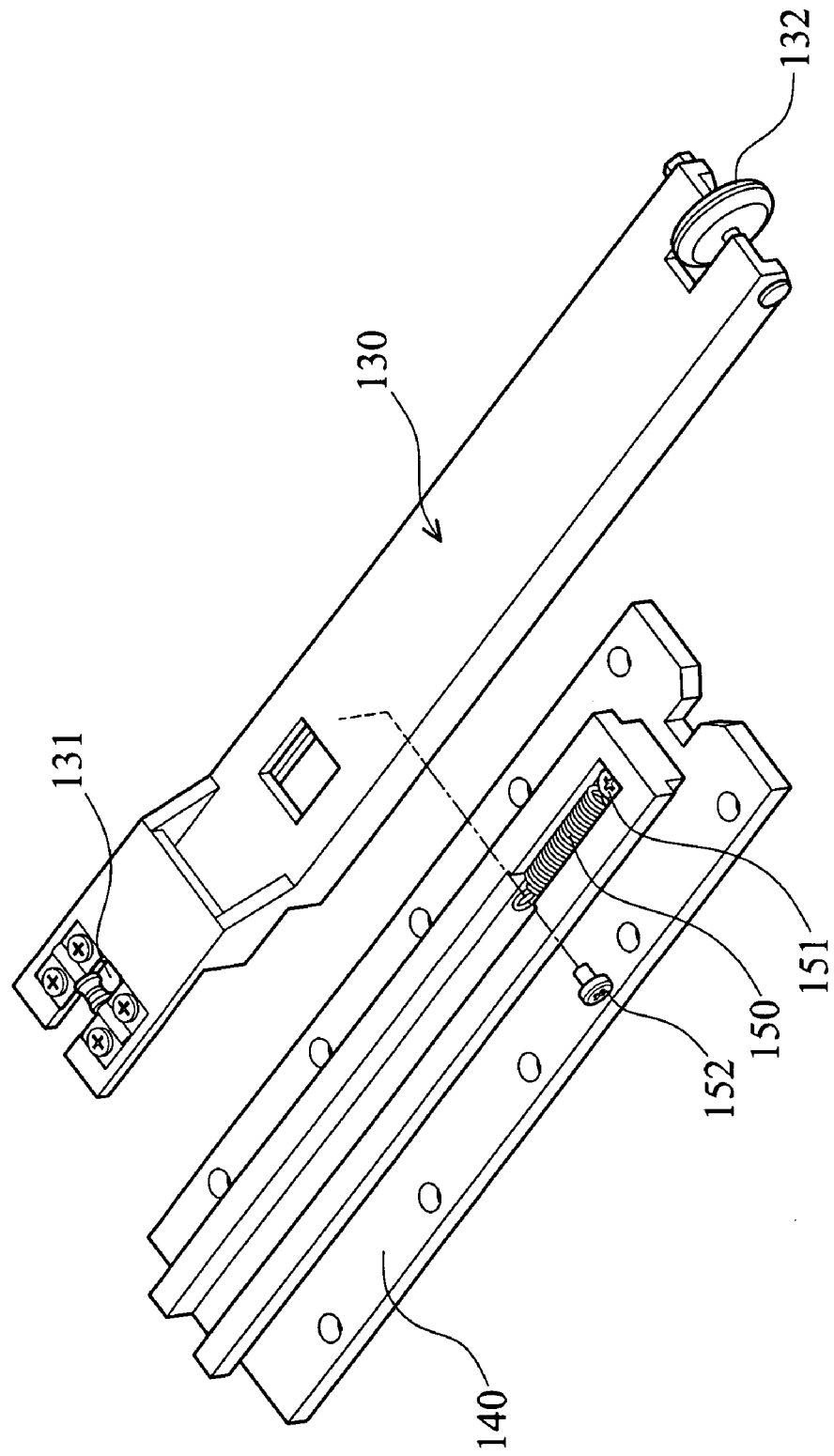
FIG. 7 is another perspective exploded view of the sliding support plate and intermediate plate of the automatic stabilizing device of the invention.

As shown in FIGS. 2, 6, and 7, each sliding support plate 130 is disposed on each intermediate plate 140 and is detachably connected to each imbalance detecting mechanism 120. Specifically, each sliding support plate 130 comprises an engaging hole 131 and a roller 132 opposite to the engaging hole 131. The engaging member 122 of the imbalance detecting mechanism 120 is detachably engaged in the engaging hole 131. The sloped guiding surface 122a of the engaging member 122 is opposite to the roller 132. The first resilient member 150 is connected between the intermediate plate 140 and the sliding support plate 130. As shown in FIG. 6 and FIG. 7, the first resilient member 150 is respectively fixed to the intermediate plate 140 and bottom of the sliding support plate 130 by bolts 151 and 152. Additionally, the first resilient member 150 may be a spring.

As shown in FIG. 1 and FIG. 2, each cover 160 is rotatably connected to the base plate 110. The cover 160 opposes and is adjacent to the roller 132 of the sliding support plate 130, preventing the interior of the automatic stabilizing device 100 from exposure. The aesthetically pleasing appearance of the display 10 is thus enhanced. Additionally, the covers 160 may be composed of elastic material, such as rubber.

Specifically, the automatic stabilizing device 100 is not limited to having the intermediate plates 140. Namely, each sliding support plate 130 can be directly disposed on the base plate 110 and each first resilient member 150 connected between the base plate 110 and the sliding support plate 130, also providing the first predetermined resilience to the sliding support plate 130.

The following description is directed to operation of the automatic stabilizing device 100.

As shown in FIG. 1, after the display 10 is placed on a flat surface (such as a table) P, the knobs 125 on opposite sides of the supporting pedestal 12 are turned, detaching the protruding ribs 125a thereof from the through grooves 123b of the sleeves 123 and the recessed grooves 121b of the detecting members 121. At this point, as shown in FIG. 2 and FIG. 6, both of the sliding support plates 130 are completely on the base plate 110 and the first resilient members 150 are stretched to provide the first predetermined resilience.

Figure 9:
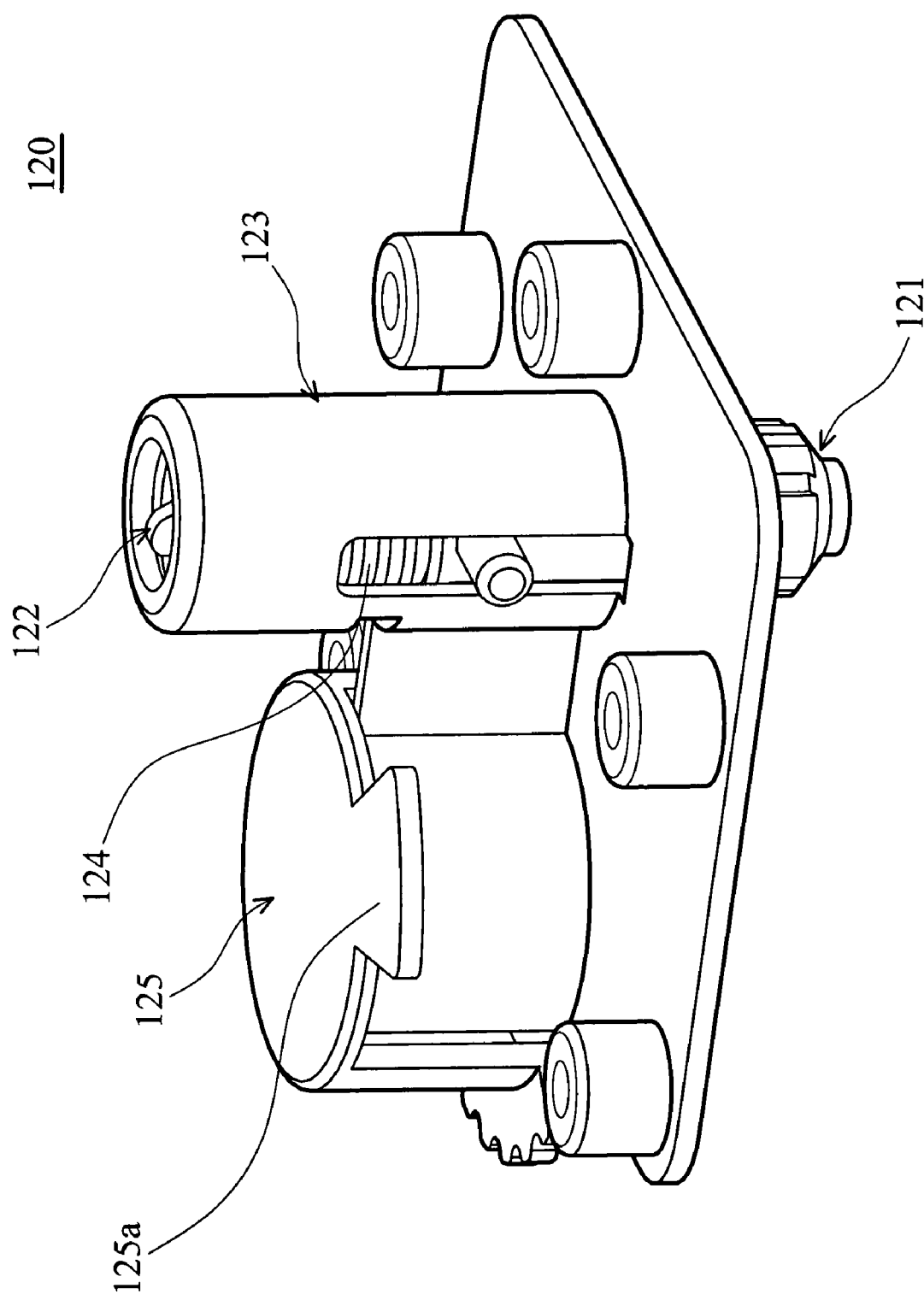
FIG. 9 is another perspective assembly view of the imbalance detecting mechanism of the automatic stabilizing device of the invention.
Figure 10:
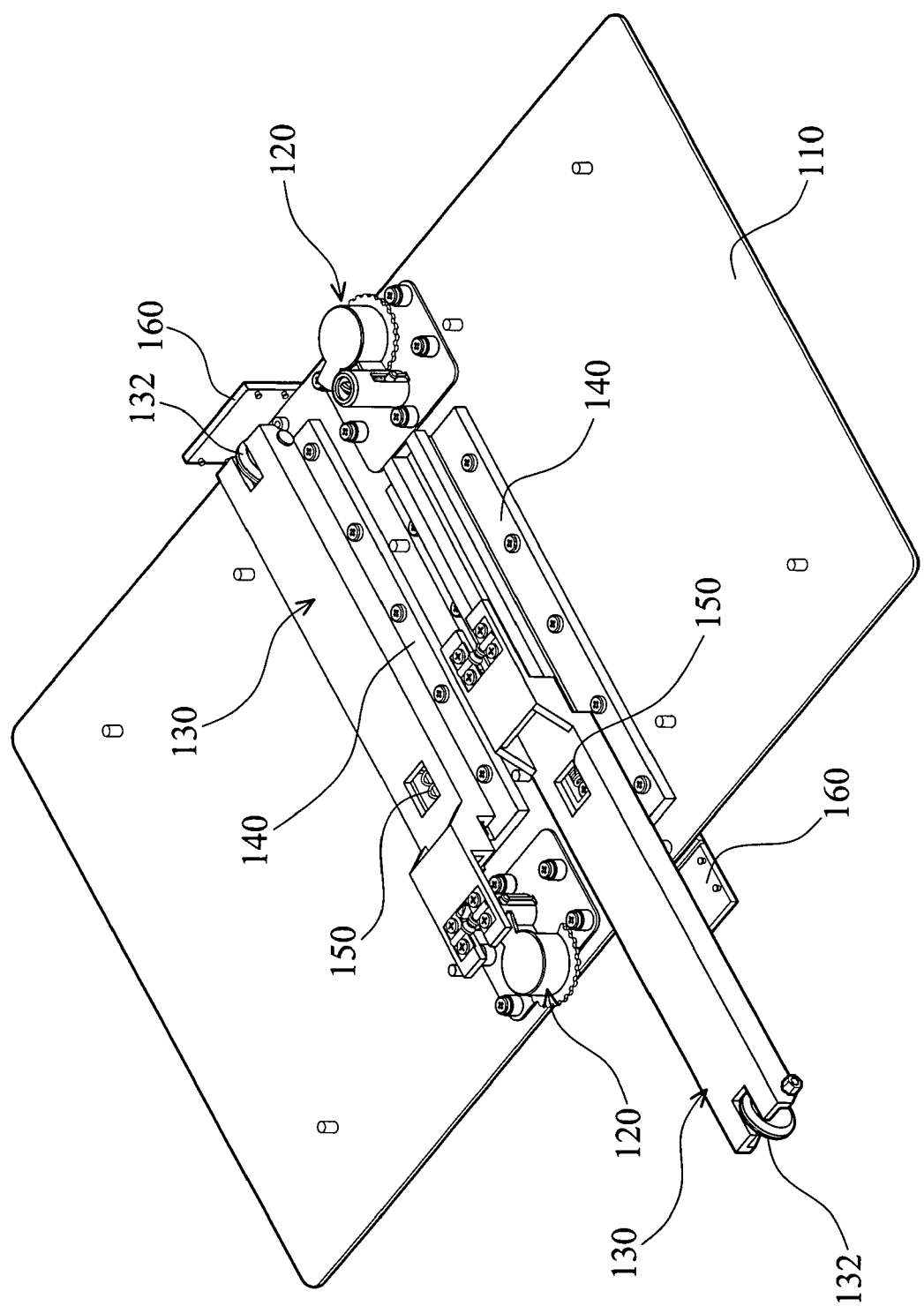
FIG. 10 is another schematic perspective view of the automatic stabilizing device of the invention.

As shown in FIG. 8, when the display 10 is subjected to external force to move toward one side (forcing the monitor 11 to tip forward), the supporting pedestal 12 tilts or swings, creating an inclined angle θ between the supporting pedestal 12 and the flat surface P. At this point, as shown in FIG. 8 and FIG. 9, the detecting member 121 in the sleeve 123 of one of the imbalance detecting mechanisms 120 moves downward by the second predetermined resilience provided by the second resilient member 124 and protrudes from the through hole 111 of the base plate 110 through the first opening 123c of the sleeve 123. The sub-sleeve 127, third resilient member 126, and engaging member 122 move downward with the detecting members 121, and the engaging member 122 moves into the sleeve 123. Accordingly, the engaging member 122 disengages from the engaging hole 131 of the sliding support plate 130. As shown in FIG. 8 and FIG. 10, one of the sliding support plates 130 rapidly slides to pass through one of the covers 160 and protrude from the base plate 110 and supporting pedestal 12 by the first predetermined resilience provided by one of the first resilient members 150. At this point, the first resilient member 150 is no longer stretched and thereby does not provide any resilience. Accordingly, because of automatic protrusion of the sliding support plate 130, the display 10 is supported thereby and does not continue to tilt. Stabilization of the display 10 is thus provided.

Similarly, when the display 10 is subjected to external force to move toward the other side (forcing the monitor 11 to tip backward), the other sliding support plate 130 rapidly slides to pass through the other cover 160 and protrude from the base plate 110 and supporting pedestal 12 by the first predetermined resilience provided by the other first resilient member 150, as shown in FIG. 11.

In another aspect, when the display 10 is no longer subjected to any external force and is stabilized, the detecting members 121, engaging members 122, second resilient members 124, sub-sleeves 127, and third resilient members 126 of the imbalance detecting mechanisms 120 return to the original positions, as shown in FIG. 3 and FIG. 5. At this point, the sliding support plates 130 can be withdrawn into the supporting pedestal 12. After contacting the engaging member 122, the sliding support plate 130 continues to move along the sloped guiding surface 122a of the engaging member 122. The engaging member 122 is then pressed into the sub-sleeve 127 and compresses the third resilient member 126. When the sliding support plate 130 moves to align the engaging hole 131 thereof above the engaging member 122, the engaging member 122 rapidly ejects by restored resilience of the third resilient member 126 and is then engaged in the engaging hole 131. Accordingly, restoring operation of the automatic stabilizing device 100 is complete.

Moreover, to prevent the detecting members 121 of the imbalance detecting mechanisms 120 from protruding from the base plate 110 and further prevent the sliding support plates 130 from protruding from the base plate 110 and supporting pedestal 12 during transportation of the display 10, the knobs 125 can be turned from the exterior of the supporting pedestal 12 before transport, enabling the protruding ribs 125a to engage the through grooves 123b of the sleeves 123 and the recessed grooves 121b of the detecting members 121. Accordingly, the sliding support plates 130 are secured in the supporting pedestal 12 during the transportation of the display 10.

Additionally, the range of the inclined angle θ can be determined by fine tuning the size and arrangement of the members in the sleeve 123. The sliding support plates 130 protrude from the base plate 110 and supporting pedestal 12 when the display 10 tilts at the inclined angle θ.

In conclusion, the disclosed automatic stabilizing device can automatically and effectively protect the display from tipping over. Moreover, when not in operation, the disclosed automatic stabilizing device can be hidden in the supporting pedestal of the display, presenting an aesthetically pleasing appearance.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic stabilizing device, comprising:
    a base plate comprising a through hole;
    an imbalance detecting mechanism disposed on the base plate and comprising a detecting member and an engaging member connected thereto, wherein the detecting member is movably disposed inside the through hole;
    a sliding support plate disposed on the base plate and detachably connected to the imbalance detecting mechanism, wherein the sliding support plate comprises an engaging hole in which the engaging member is detachably engaged; and
    a first resilient member connected between the base plate and the sliding support plate, providing a first predetermined resilience to the sliding support plate, wherein, when the base plate swings to extend the detecting member from the through hole, the engaging member moves and disengages from the engaging hole, and the sliding support plate slides to protrude from the base plate by the first predetermined resilience.

2. The automatic stabilizing device as claimed in claim 1, wherein the imbalance detecting mechanism further comprises a sleeve corresponding to the through hole of the base plate, the detecting and engaging members are movably disposed inside the sleeve, and the engaging member moves into the sleeve when the detecting member moves to protrude from the through hole.

3. The automatic stabilizing device as claimed in claim 2, wherein the imbalance detecting mechanism further comprises a second resilient member abutting the sleeve and the detecting member, providing a second predetermined resilience to the detecting member.

4. The automatic stabilizing device as claimed in claim 2, wherein the sleeve comprises a sliding groove, and the detecting member comprises a positioning portion sliding in the sliding groove.

5. The automatic stabilizing device as claimed in claim 2, wherein the imbalance detecting mechanism further comprises a knob, the sleeve further comprises a through groove, the detecting member further comprises a recessed groove corresponding to the through groove, and the knob is rotatably and detachably engaged in the through and the recessed grooves.

6. The automatic stabilizing device as claimed in claim 2, wherein the imbalance detecting mechanism further comprises a third resilient member disposed between the detecting member and the engaging member.

7. The automatic stabilizing device as claimed in claim 6, wherein the imbalance detecting mechanism further comprises a sub-sleeve disposed on the detecting member, the engaging member abuts the sub-sleeve, and the third resilient member is disposed inside the sub-sleeve.

8. The automatic stabilizing device as claimed in claim 1, wherein the sliding support plate further comprises a roller opposite to the engaging hole.

9. The automatic stabilizing device as claimed in claim 8, wherein the engaging member comprises a sloped guiding surface opposite to the roller.

10. The automatic stabilizing device as claimed in claim 8, further comprising a cover rotatably connected to the base plate and opposing and adjacent to the roller.

11. The automatic stabilizing device as claimed in claim 10, wherein the cover comprises elastic material.

12. The automatic stabilizing device as claimed in claim 1, further comprising an intermediate plate disposed on the base plate, wherein the sliding support plate is disposed on the intermediate plate, and the first resilient member is disposed in the intermediate plate and connected between the intermediate plate and the sliding support plate.

13. A display, comprising:
    a monitor;
    a supporting pedestal connected to and supporting the monitor;
    a base plate disposed under and connected to the supporting pedestal, comprising a through hole;
    at least one imbalance detecting mechanism disposed on the base plate and comprising a detecting member and an engaging member connected thereto, wherein the detecting member is movably disposed inside the through hole;
    at least one sliding support plate disposed on the base plate and detachably connected to the imbalance detecting mechanism, wherein the sliding support plate comprises an engaging hole in which the engaging member is detachably engaged; and at least one first resilient member connected between the base plate and the sliding support plate, providing a first predetermined resilience to the sliding support plate, wherein, when the supporting pedestal swings to extend the detecting member from the through hole, the engaging member moves and disengages from the engaging hole, and the sliding support plate slides to protrude from the base plate and supporting pedestal by the first predetermined resilience.

14. The display as claimed in claim 13, wherein the imbalance detecting mechanism further comprises a sleeve corresponding to the through hole of the base plate, the detecting and engaging members are movably disposed inside the sleeve, and the engaging member moves into the sleeve when the detecting member moves to protrude from the through hole.

15. The display as claimed in claim 14, wherein the imbalance detecting mechanism further comprises a second resilient member abutting the sleeve and the detecting member, providing a second predetermined resilience to the detecting member.

16. The display as claimed in claim 14, wherein the sleeve comprises a sliding groove, and the detecting member comprises a positioning portion sliding in the sliding groove.

17. The display as claimed in claim 14, wherein the imbalance detecting mechanism further comprises a knob, the sleeve further comprises a through groove, the detecting member further comprises a recessed groove corresponding to the through groove, and the knob protrudes from the supporting base and is rotatably and detachably engaged in the through and the recessed grooves.

18. The display as claimed in claim 14, wherein the imbalance detecting mechanism further comprises a third resilient member disposed between the detecting member and the engaging member.

19. The display as claimed in claim 18, wherein the imbalance detecting mechanism further comprises a sub-sleeve disposed on the detecting member, the engaging member abuts the sub-sleeve, and the third resilient member is disposed inside the sub-sleeve.

20. The display as claimed in claim 13, wherein the sliding support plate further comprises a roller opposite to the engaging hole.

21. The display as claimed in claim 20, wherein the engaging member comprises a sloped guiding surface opposite to the roller.

22. The display as claimed in claim 20, further comprising at least one cover rotatably connected to the base plate and supporting pedestal and opposing and adjacent to the roller.

23. The display as claimed in claim 22, wherein the cover comprises elastic material.

24. The display as claimed in claim 13, further comprising at least one intermediate plate disposed on the base plate, wherein the sliding support plate is disposed on the intermediate plate, and the first resilient member is disposed in the intermediate plate and connected between the intermediate plate and the sliding support plate.

* * * * *